United States Patent
Hoover et al.

(10) Patent No.: US 8,816,845 B2
(45) Date of Patent: Aug. 26, 2014

(54) METHOD AND SYSTEM FOR GENERATING AN ALERT BASED ON CAR SEAT USE DETECTION

(75) Inventors: Scott J. Hoover, Allen, TX (US); Joseph Hilburn, Frisco, TX (US); Paul Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 13/221,557

(22) Filed: Aug. 30, 2011

(65) Prior Publication Data

US 2013/0049955 A1 Feb. 28, 2013

(51) Int. Cl.
*G08B 1/08* (2006.01)

(52) U.S. Cl.
USPC .............. 340/539.11; 340/666; 340/539.21; 340/539.23

(58) Field of Classification Search
USPC ............ 340/666, 539.11, 539.21, 539.23; 180/268, 271, 273; 177/136; 200/85 A
See application file for complete search history.

(56) References Cited

U.S. PATENT DOCUMENTS

| | | | | |
|---|---|---|---|---|
| 6,922,147 B1* | 7/2005 | Viksnins et al. | ............ | 340/573.1 |
| 6,930,614 B2* | 8/2005 | Rackham et al. | ......... | 340/686.1 |
| 7,009,522 B2* | 3/2006 | Flanagan et al. | ............. | 340/666 |
| 7,218,218 B1* | 5/2007 | Rogers | .......................... | 340/522 |
| 2003/0062996 A1* | 4/2003 | Flanagan et al. | ............. | 340/457 |
| 2005/0030188 A1* | 2/2005 | Flanagan et al. | ............. | 340/667 |
| 2009/0212955 A1* | 8/2009 | Schoenberg et al. | ...... | 340/573.1 |
| 2010/0302022 A1* | 12/2010 | Saban | ........................... | 340/459 |
| 2011/0084807 A1* | 4/2011 | Logan et al. | ................ | 340/10.1 |

* cited by examiner

*Primary Examiner* — Daryl Pope

(57) ABSTRACT

An approach for providing notifications to caregivers based on the detected presence of a child in a car seat is described. Physical presence of an object within a car seat is detected. A determination is made that a proximity threshold between a mobile device and the car seat is satisfied based on the presence information, range information associated with the mobile device, or a combination thereof. A notification message is generated in response to the detected physical presence of the object to indicate the presence of the object in the car seat based on the determination. Initiation of the transmission of the notification message to a mobile device within a predetermined proximity of the car seat is performed.

22 Claims, 10 Drawing Sheets

100

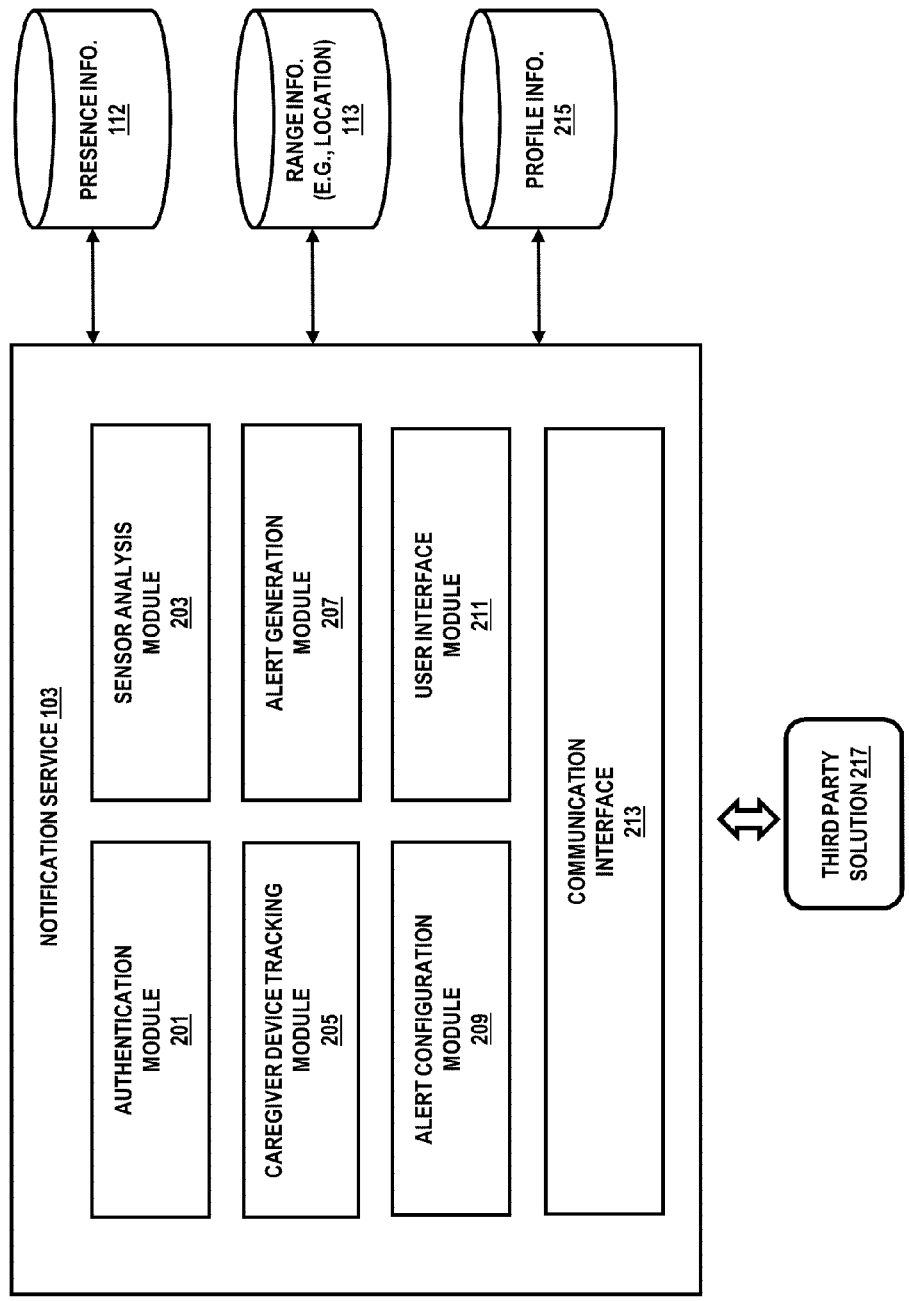

FIG. 2B
240

| INITIAL/ PRIMARY CONNECTIVITY 241 | RANGE 243 | DEVICE/ SENSOR STATUS 245 | RESPONSE TIME / ACTION 247 | NOTIFICATION SERVICE ACTION 249 |
|---|---|---|---|---|
| BLUETOOTH | LESS THAN OR EQUAL TO X FT (WITHIN RANGE) | ON/ON | LESS THAN OR EQUAL TO Y SECS (WITHIN ACCEPTABLE RESPONSE TIME) | GENERATE INITIAL WARNING |
| | GREATER THAN X FT (OUT OF RANGE) | ON/ON | LESS THAN OR EQUAL TO Y SECS | SWITCH TO WI-FI; GENERATE INITIAL WARNING |
| | GREATER THAN X FT (OUT OF RANGE) | ON/ON | GREATER THAN Y SECS | SWITCH TO WI-FI; GENERATE SECONDARY CARE GIVER WARNING; GENERATE 1ST EMERGENCY CONTACT WARNING |
| | UNKNOWN | OFF/ON | GREATER THAN Z SECS | SWITCH TO WI-FI; GENERATE DISTRESS NOTIFICATION (E.G., POLICE) |
| WI-FI | LESS THAN OR EQUAL TO X FT (WITHIN RANGE) | ON/ON | LESS THAN OR EQUAL TO Y SECS (WITHIN ACCEPTABLE RESPONSE TIME) | GENERATE INITIAL WARNING |
| ..... | ..... | ..... | ..... | ..... |

250

252

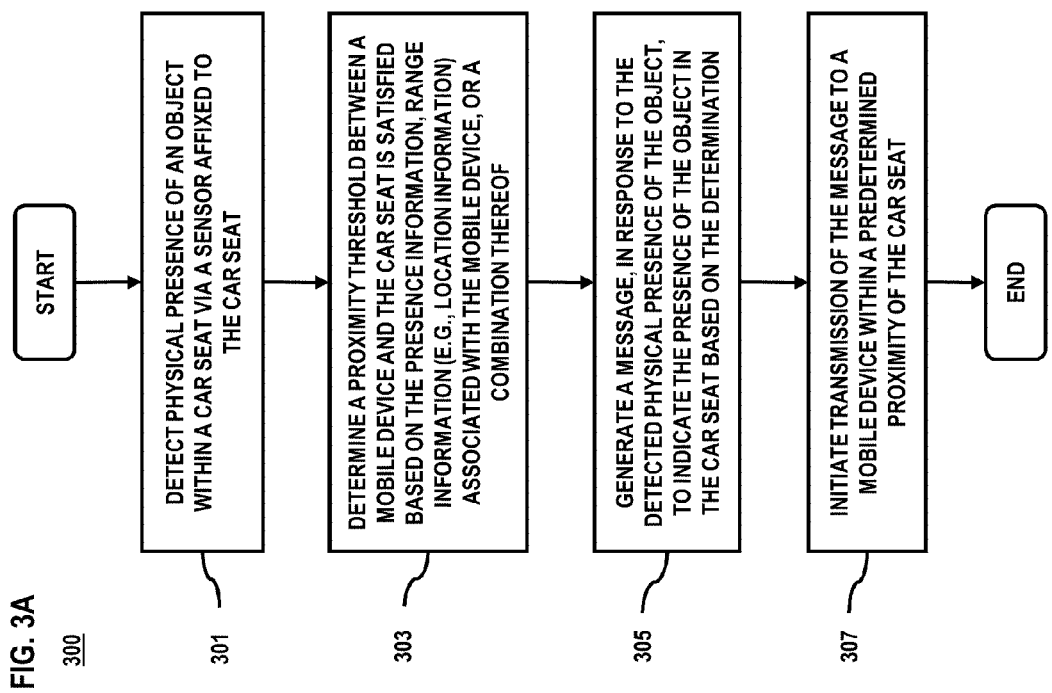

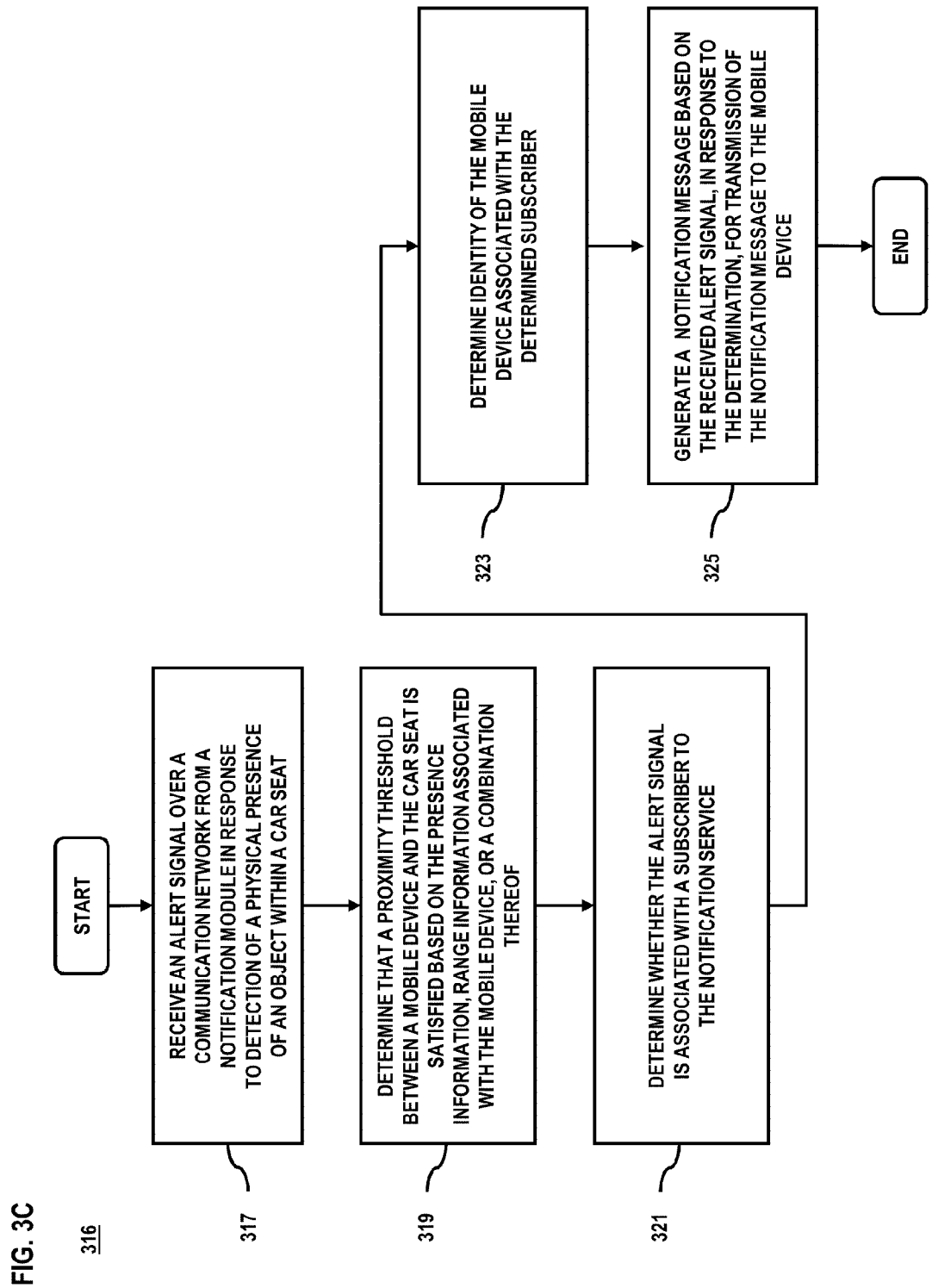

400

412

600

US 8,816,845 B2

METHOD AND SYSTEM FOR GENERATING AN ALERT BASED ON CAR SEAT USE DETECTION

BACKGROUND INFORMATION

Child safety continues to pose a major concern in all commercial industries, particularly the automotive sector where safety is a key differentiator. Car seat design has undoubtedly saved countless lives in vehicle collisions. However, child death can also occur as a result of hyperthermia, heat stroke, dehydration and other heat related illnesses resulting from the child being left unattended in motor vehicles in their car seats. Typically, this occurs as a result of the caregiver simply forgetting the child is in the car and then inadvertently locking the child within the car. This is especially problematic with infants and toddlers, as they are often left restrained in a car seat (while the internal temperature of the vehicle increases due to hot weather conditions or at the other extreme, reduces to a severely low temperature).

Based on the foregoing, there is a need for a mechanism to detect presence of a child in a car seat and to notify a caregiver or emergency responder.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2A is a diagram of a notification service, according to one embodiment;

FIG. 2B is a diagram of an alert configuration table maintained by the notification service, according to one embodiment;

FIGS. 3A-3C are flowcharts of processes for providing real-time notifications to caregivers based on the detected presence of a child in a car seat, according to various embodiments;

DESCRIPTION OF THE PREFERRED EMBODIMENT

An apparatus, method and software for providing real-time notifications to caregivers based on the detected presence of a child in a car seat is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to car seats, it is contemplated that these embodiments have applicability to any seating device intended for supporting or maintaining infants and toddlers during transport. This includes, for example, booster seats, portable carriages, travel restraints, strollers, and the like. Furthermore, while various exemplary embodiments pertain to the detection or generation of location information by way of global positioning techniques, it is contemplated that any data protocols, methodologies or systems for supporting location based services are applicable.

Figure 1:
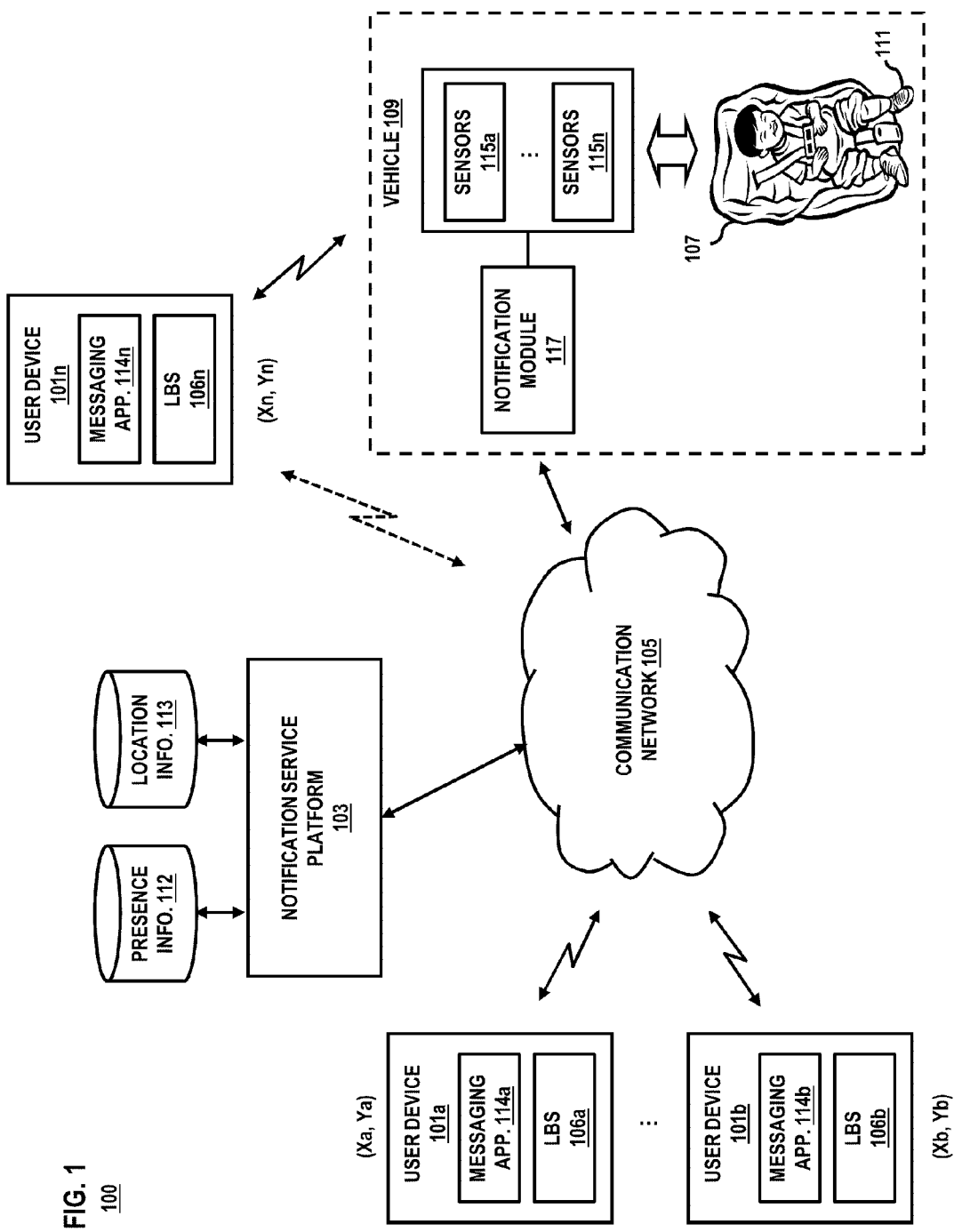
FIG. 1 is a diagram of a system for providing real-time notifications to caregivers based on the detected presence of a child in a car seat, according to one embodiment.

FIG. 1 is a diagram of a system for providing real-time notifications to caregivers based on the detected presence of a child in a car seat, according to one embodiment. For the purposes of explanation, system 100 is shown to include one or more user devices 101a-101n (e.g., mobile device, smart phone, netbook, laptop, set-top box, or any communications enabled computing device), which are configured to communicate with a notification service platform 103 for processing alerts. In certain embodiments, the notification service platform 103 generates and transmits notification messages to the user device 101 of a user (e.g., caregiver) based on the detected presence of a person (e.g., a dependent or a child) in a car seat. The notification messages include one or more warnings, alerts, notices, icons and the like for indicating that a dependent is left behind in the vehicle. In addition, the notification service platform 103 generates and transmits notification messages to the user devices 101a-101n of designated alternate caregivers or emergency contacts when the caregiver does not respond to one or more notification messages in a timely manner.

As mentioned, dependents, e.g., young children, left unattended in vehicles during hot weather conditions are particularly susceptible to heat related illnesses such as heat stroke and dehydration. In some instances, the environmental temperature causes the internal temperature of the vehicle to rise to levels that can even result in a child's death. This is due, at least in part, to the physiology of children as well as their inability to take active measures to avoid the heat when in a vehicle. For example, a child's core body temperature—i.e., that required for basic organ function—rises three to five times faster than an adult's. Also, with the widespread use of child-proof locks, child restraining devices and power-lock windows in most vehicles, children are helpless and rely on their caretaker for their safety.

In many instances, children are left in vehicles by their caregivers unintentionally. For instance, the caregiver may get distracted as they run errands, may forget the child is in the car as the child is soundly asleep, or may forget the child is present because the child is not in direct view. Unfortunately, caregivers have no convenient mechanism for alerting them of instances where a child is left in a vehicle unattended.

To address this issue, system 100 presents a notification service platform 103 for generating and transmitting notification messages in response to the detected presence of an object (e.g., a child 111) in a car seat 107 while the caregiver is out of range of the vehicle 109. In certain embodiments, the notification service platform 103 receives and processes presence information 112, which may include for example, data acquired by one or more sensors 115a-115n or detection mechanisms for indicating the presence of a child 111 in the car seat 107. Presence information 112 as acquired by the sensors 115a-115n may include weight data, motion data, sound data, or a combination thereof.

By way of example, one or more of the sensors 115a-115n may be configured as weight detection sensors for acquiring and compiling weight data as the child 111 is seated in the car seat 107. The sensors 115a-115n are therefore affixed to any surface of the car seat 107 that makes contact with a seated child—i.e., the bottom support of the car seat 107. Moreover, the sensors 115a-115n are held in place by way of glue or a fastening device and may be placed underneath a material cover of the car seat 107. It is contemplated, in some embodiments, that the sensor 115a-115n may be integrated directly into the car seat 107 as part of the fabrication process, or alternatively, placed into one or more dedicated slots crafted during the fabrication process for placement of the sensors.

In certain embodiments, the one or more sensors 115a-115n in conjunction with notification module 117 can transmit presence information 112 to other devices 101a-101n using known or still developing communication protocols. As such, notification module 117 may include circuitry configured to support various technologies for transmission of information to one or more user devices 101a-101n and/or the notification service platform 103 over communication network 105. The technologies and protocols may include, for example, Bluetooth, ZigBee, infrared, near field communication (NFC), short-range wireless or other local or peer-to-peer communication protocols and techniques. Also, by way of these protocols, the one or more sensors 115a-115n may be tethered or otherwise connected to devices 101a-101n for enabling transmission of signals indicating they are within range of one another. In addition, the sensors 115a-115n, alone or in conjunction with notification module 117, may submit signals for indicating they are actively acquiring presence information 112, i.e., weight data or motion data. Once broadcast, the signals may be detected by the device 101a-101n of the caregiver or the notification service platform 103 a means of confirming the active presence of a child 111 in the car seat 107 to within a predetermined proximity. When this proximity threshold is exceeded or otherwise satisfied, however, the tethered connection to the device 101a-101n is broken and/or the notification service platform 103 is triggered to cause transmission of one or more notification messages and alerts to the caregiver or emergency responder on an escalating scale. In this example, user devices 101a and 101b may be remotely located from the vehicle 109, while user device 101n is within the proximity. As such, user device 101n can directly communicate with notification module 117 and/or sensors 115a-115n, as well as the communication network 105 to receive information (e.g., notification message, etc.).

In addition to maintaining presence information 112 related to the object (child 111) placed in the car seat, the notification service platform 103 also persistently tracks range information (e.g., location information) 113 for the user device 101a. The location information 113 is processed by the service platform 103 for determining if a proximity threshold between the user device 101a and the car seat is exceeded. Location information 113 may include, for example, any data for indicating the geographic location, position, point of reference or whereabouts of the user devices 101a-101n of the user (or the car seat). Also, the location information 113 may be determined based on global positioning system (GPS) techniques, local positioning system (LPS) techniques, or a combination thereof as performed by a location based service (LBS) 106a-106n accessible to the user devices 101a-101n that interacts with the notification service platform 103. The LBS 106a-106n may be configured to facilitate the operation of one or more integrated sensory mechanisms of the user device 101a such as a geospatial sensors, camera device, sound recorder, accelerometer, gyroscope for supporting acquisition of data required for performance of GPS or LPS techniques. It is contemplated that range information can include non-GPS based tracking—e.g., Bluetooth, WiFi range detection, etc.

In certain embodiments, the location information 113 may correspond to specific coordinates for indicating a geographic reference point of the user devices 101a-101n, i.e., coordinates (Xa, Ya) through (Xn, Yn) representing respective latitude and longitude data. In addition, the location information 113 may be generated as geospatial data for indicating relative location or distance information relative to a specific moment or duration of time. It is noted that the location information 113, in certain embodiments, may be used in connection with mapping information for providing a visual representation of the geographic location of the user device 101a-101n. Also, of note, location information as generated for the vehicle 109 (e.g., based on an LBS service of the vehicle 109) can also be represented to a map along with that of the user devices 101a-101n; providing a visual representation of a relative distance between the device 101a-101n and the vehicle 109 where the child 111 is currently located.

By way of example, notification messages are generated by the service based on the determined presence of the child 111 in the car seat 107, and exceeding of a proximity threshold between the car seat 107 or vehicle 109 and the user device 101a-101n. In certain embodiments, the notification service platform 103 establishes a wireless link directly with the user device 101a-101n of the caregiver for enabling transmission of messages in accordance with various messaging protocols. For example, the notification message may be generated in the form of a short messaging service (SMS), a media messaging service (MMS) message or an e-mail. Messages are received at the user device 101a-101n by one or more messaging applications 114a-114n configured to present messages to a display of the device 101a-101n. The messaging application (e.g., applications 114a-114n) can be any program, process, or application having the appropriate application programming interfaces (APIs) and functions for interpreting the messages and translating them to a user interface. This may include an email application, text messaging application, web application (e.g., browser) or service, or a combination thereof. In certain instances, the messages may include text, graphics, sound, video or other data types for execution by the messaging application 114a-114n according to the capabilities of the user device 101a-101n or preferences of the user. The sound may be an alert that increases in intensity depending on a user response to the message. In addition, a color scheme, text size, graphic or other feature of the message may be adjusted concurrent with the level of escalation.

The messaging application 114a-114n is configured to receive an input for indicating a user response to the notification message as received to the device 101a-101n. For example, a user may be presented with various action buttons for selection by a user of the device 101a-101n in connection with a received message. Alternatively, responses to notification messages are received by the notification service platform 103 based on a detected change in proximity of the user with respect to the car seat 107. By way of example, in response to a message, the user may decide to return to the vehicle 109 where the car seat 107 is maintained. Location information is maintained as the user approaches the vehicle 109. When the proximity threshold that was once exceeded is determined to be met as a result of the new location of the user, the notification message may be caused to be cancelled or modified accordingly. It is contemplated, in certain embodiments, that unlocking or opening of a door of the vehicle, activation of a window, activation of the engine or various electrical systems of the vehicle 109, removal of the child (e.g., loss of presence information), or other forms of stimulus may be detected as response input by the notification service platform 103.

In certain embodiments, an alert configuration scheme is maintained by the service platform 103 to ensure messages are transmitted periodically in response to the presence information and/or location information indicating a surpassing of the proximity threshold. The alert configuration scheme dictates the notification messaging actions to be taken, the frequency of alerts, the level of escalation of notifications and other actions to be performed by the notification service platform 103 based on the response or lack thereof of the caregiver to one or more notifications. It is noted that the alert configuration scheme is maintained in connection with a user profile of a caregiver registered with the service platform 103, as a default execution of the service platform 103, or a combination thereof.

For example, when an initial notification message is sent to the user device 101a of the caregiver, the alert configuration scheme may call for the notification message module to automatically send N additional messages of a specific type if no response is received after T seconds. As another example, the alert configuration scheme may trigger the sending of a notification message to an emergency contact, such as an alternate caregiver, in response to a lack of response by the primary caregiver. In certain embodiments, the alternate caregiver is contacted on the basis of their proximity within an acceptable range of the car seat 107—i.e., determined on the basis of location information for the alternate. Still further, the scheme may specify contacting of an emergency responder, such as the local police in cases where no response is received from the caregiver, the alternate caregiver, or a combination thereof. This escalation in transmission of notification messages may be triggered to occur after a set duration of time elapses between respective notifications.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment of notification messages or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

In various embodiments, network 105 may be any suitable wireline and/or wireless network, and be managed by one or more service providers. For example, network 105 may include an integrated services digital network (ISDN), public switched telephone network (PSTN) or other like network. In the case of a wireless network configuration, various technologies may be employed including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

It is noted that the notification service platform 103 may be implemented for use over the communication network 105 as a hosted solution or subscription service. In certain embodiments, the service platform 103 is made available by a service provider related to the caregivers, alternate caregiver or emergency contact, or a combination thereof. This may include, for example, the telecommunications service provider that supports use of user devices 101a-101n, the provider of the communication network 105, or a combination thereof. FIG. 2 is a diagram of the notification service, according to one embodiment.

According to one embodiment, the notification platform 103 includes various executable modules for performing one or more computing, data processing and network based instructions that in combination provide a means of providing real-time notifications to caregivers based on the detected presence of a child in a car seat. Such modules can be implemented in hardware, firmware, software, or a combination thereof. By way of example, the notification service platform 103 may include an authentication module 201, sensor analysis module 203, device tracking module 205, alert generation module 207, alert configuration module 209, user interface module 211 and communication interface 213.

In addition, the service platform 103 also accesses sensor data as generated by the one or more sensors 115a-115n from a presence information database 112, profile data 215 pertaining to one or more registered users with the service platform 103 and location information 113 relating to the user devices 115a-115n, the location of the vehicle 109, or a combination thereof. In certain instances, the location information 113 may be generated by the notification service platform 103 directly or in connection with a third-party location service provider 217. The aforementioned modules 201-213 may access one or more of the databases for enabling execution of its various functions.

In one embodiment, an authentication module 201 authenticates users and user devices 101a-101n for interaction with the notification service platform 103. By way of example, the authentication module 201 receives a request to subscribe to the notification service platform 103 for enabling transmission of alerts related to a child in a car seat 107 or vehicle unattended. The subscription process may include the establishing of a preferred mode of alert transmission, including text, email or dedicated application based alerting (e.g., pop-up window). Also, the process may entail the establishing of a secondary or tertiary alternate caregiver or emergency contact to notify in cases where the primary caregiver cannot be reached. Other preferences and settings may also be established based on the features of the vehicle, including vehicle tracking, remote vehicle starting or air conditioning activation in relation to a response to an alert, etc. Preferences and settings information may be referenced to a specific user, user device, or combination thereof, and maintained as profile information 215.

The authentication process performed by the module 201 may also include receiving and validating a login name and/or user identification value as provided or established for a particular user during an alert activation or registration process with the service provider. The login name and/or user identification value may be received as input provided by the user from the user device 101 or other device via a graphical user interface to the platform 103 (e.g., as enabled by user interface module 211). Registration data 217 for respective subscribers, which contains pertinent user or device profile data, may be cross referenced as part of the login process. Alternatively, the login process may be performed through automated association of profile information 215 maintained as registration data with an IP address, a carrier detection signal of a user device 101, mobile directory number (MDN), subscriber identity module (SIM) (e.g., of a SIM card), radio frequency identifier (RFID) tag or other identifier. Still further, the authentication module 201 may also be configured to receive input provided by registered/authenticated users in response to the transmission of a notification message. By way of this approach, having authenticated the device from which the input was acquired and received, the authentication module 201 passes the input on to the sensor analysis module 203.

In one embodiment, the sensor analysis module 203 analyzes the presence information 112 as provided by the one or more sensors 115a-115n affixed to the car seat 107. The module 203 is able to process the data according to the type of sensor that provided it—i.e., if the sensor is a weight detection sensor, the module 203 processes and interprets the weight data while motion data is processed according to its type. The sensor analysis module 203 also operates on data that is directly transmitted from the sensors 115a-115 to the notification service platform 103 as opposed to user devices 101a-101n. Still further, when different types of presence information 112 is received from different types of sensors, the sensor analysis module 203 processes the data types with respect to one another for determining one or more conditions associated with the child, the vehicle or a combination thereof. By way of example, presence information in the form of weight data may be correlated with negligible motion data for determining the child 111 is asleep or inactive while in the car seat. On the other hand, detected weight data may be correlated with active motion data (e.g., speed, tilt) for determining the child 111 is awake or active in the seat 107.

In addition to processing presence information, the sensor analysis module 203 may also be configured for operation in connection with one or more sensors of the vehicle 109. For example, a temperature detection sensor, vehicle condition status sensor, light detection sensor, auto alarm sensor, etc., of the vehicle 109 may provide temperature data, vehicle condition status information, day or night indication data and auto alarm activation data respectively. The sensor analysis module 203 may utilize this information to determine to escalate a notification message (e.g., issue final versus first warning), a level of priority to assign to a message, a specific contact to transmit a notification message to, or other actions to exercise based on vehicular or environmental factors. By way of example, when the sensor analysis module 103 determines the presence information related to a child 111 along with a critical temperature being met, the sensor analysis module 203 prompts the alert generation module 207 to transmit a notification message to an emergency responder. As another example, when the module 203 detects that a child 111 is present while the vehicle is in motion (e.g., vehicle stolen or child abducted), a notification message is automatically sent to the police.

In one embodiment, the caregiver device tracking module 205 operates in connection with the LBS 106a-106b of user devices 101a-101n to receive or generate location information. Based on the location information, the module 204 determines if the caregiver is within an acceptable range of the vehicle 109 where the car seat 107 is located. In addition, the caregiver device tracking module 205 calculates the relative distances between the caregiver, one or more alternate caregiver, the car seat 107, or a combination thereof. Under approach, the module 205 may determine which person is best suited for responding to an alert for which a notification message was sent via the alert generation module 207. For example, when the caregiver device tracking module 205 determines that the caregiver far exceeds the proximity threshold or is unreachable or unable to be found, the module 205 may prompt the alert generation module to send a notification message to the alternate caregiver closest to the car seat 107. It is noted that the caregiver device tracking module 205 may perform its various functions independent of the LBS 106a-106n of respective user devices 101a-101n or in connection with a third-party service provider (e.g., GPS service provider). Also of note, the caregiver tracking module 205 may operate upon the location information in connection with a mapping service to generate mapping information representative of the location of the caregiver, alternate caregivers, the car seat, the vehicle, or a combination thereof.

In certain embodiments, the alert configuration module 209 enables the configuration of device actions to be taken relative to the determined presence of a child 111 in a car seat by the sensor analysis module 203. Also, the alert configuration module 209 enables the user, manufacturer or communication service provider to establish various response settings, proximity settings, connectivity settings and other variables for affecting the response of the system 103 and execution of the alert generation module 207. An example portion of an alert configuration table, as maintained by the alert configuration module with respect to a given user profile information 215, is shown in FIG. 2B according to one embodiment. It is noted that the settings of the alert configuration table may vary from that shown in the figure and may differ depending on the device implementation, user permission settings, notification service platform 103 provider restrictions, etc.

Columns 241-247 of the configuration table 240 represent various conditions or criteria to account for while the final column 249 represents the corresponding action to be taken relative to said conditions. A first column 249 labeled "Initial/Primary Connectivity" corresponds to the mode of connection between the user device 101 and the one or more sensors 101a-101n, which for this example is Bluetooth (e.g., tethering). Other connection types between the sensors 115 and the user device 101 may include a Wi-FI connection, in which the one or more sensors communicate with the device by way of direct interaction with the notification service platform 103. Other connectivity modes would also be featured in the configuration table 240 accordingly.

It is noted that the type of wireless connection may be prioritized, such as to maximize tracking and alerting capability, via the alert configuration table 240. By way of example, the connectivity between the user device 101 and wireless sensors 115a-115n may be configured to enable Bluetooth tethering to within a first proximity between the device and the sensor; wireless connectivity upon detection of exceeding of the predetermined range or due to a lack of response; and GPS tracking as a last resort, for instance. The wireless connectivity may be further associated with a level of escalation of the notification messaging, including a first, secondary, tertiary and distress message corresponding to a Bluetooth, Wi-FI and GPS based tracking accordingly.

A next column 243 labeled "Range" corresponds to the proximity threshold setting between the user device 101 and the one or more sensors 101a-101n of the car seat 107. By way of example, the proximity threshold is an acceptable value, an excessive value, or unknown. In another column labeled "Device/Sensor Status," the active status of the device 101 and/or sensors 115 are specified. The user device, in this example, can be in an "ON" or "OFF" state—i.e., device powered ON or OFF. Similarly, the sensors 115a-115n may be "ON" or "OFF," corresponding to an active or inactive acquiring of presence information and hence detection of a child 111. For example purposes with respect to the configuration table 240, the status of the sensors 115a-115n is always "ON" (presence of child 111 detected).

Another column 247 labeled "Response Time" corresponds to the amount of time it takes to receive an input at the messaging application 114a-114n in response to a notification message. The column 247 also corresponds to the amount of time it takes to determine satisfaction of an action suitable for representing a response to a notification message. By way of example, the response time occurs within an acceptable amount of time or exceeds a predetermined response threshold. Furthermore, the response action occurs within this time for nullifying the notification message or ignoring the message. By way of example, a response time may be established by the caregiver, the service provider, or a combination thereof. As another example, the response action may be a determination based on location information tracking that a caregiver is headed back towards the car seat 111 in response to a notification message. The response time relates, at least in part, to the level of escalation or priority of a notification message.

The column 249 labeled "Notification Service Action" corresponds to the action to be executed by the notification service platform 103 relative to various conditions or criteria established in the various other columns 241-247 and the presence of a child 111. This corresponds to the response action required of the alert generation module 207 based on information/criteria as provided by the sensor analysis module 203, caregiver device tracking module 205 and authentication module 201. Hence, the one or more factors/conditions dictate the response action. For example, with respect to row 250, the combination of Bluetooth connectivity, the range being less than the proximity threshold, device/sensor status being "ON" and response time within a certain amount of seconds; the corresponding response action by the alert generation module 207 is to generate an initial warning notification message. As another example, the combination of factors expressed in row 252 of the range being unknown, device being off (untraceable) and response time exceeding a secondary threshold Z for escalation; the alert generation module 207 prompts the connectivity to be Wi-FI for direct connection between the sensors 115 and the service platform 103. The alert generation module 207 also transmits a distress message for emergency responders (e.g., local police) via a public safety access point (PSAP).

The alert configuration module 209 maintains the alert configuration table 240 in connection with specific user profile information 215. While not shown, it is noted that the configuration table may also include additional conditional settings (e.g., columns) for supporting advanced response actions including, for example, initiating vehicle controls (e.g., unlocking doors, rolling down a window, disabling the engine, activating the air conditioner), initiating user device controls (e.g., order of priority of caregiver devices to notify, powering up a device), initiating message controls (e.g., amber alert message sent to authorities in response to unwarranted vehicle movement).

In one embodiment, the user interface module 211 enables presentment of data to a graphical user interface of the nodes 101. The user interface module 206, for example, renders graphic primitives to the messaging application 114a-114n of the user devices 101a-101n via the communication interface 213 over a network 105. As such, the user interface module 211 executes in accordance with the application programming interface and operating system instructions of the devices 101. Also, the communication interface 213 supports transmission of data, such as response input, based on one or more action buttons and/or notification messages presented to a display of the user devices 101a-101n by the user interface module 211.

Figure 6:
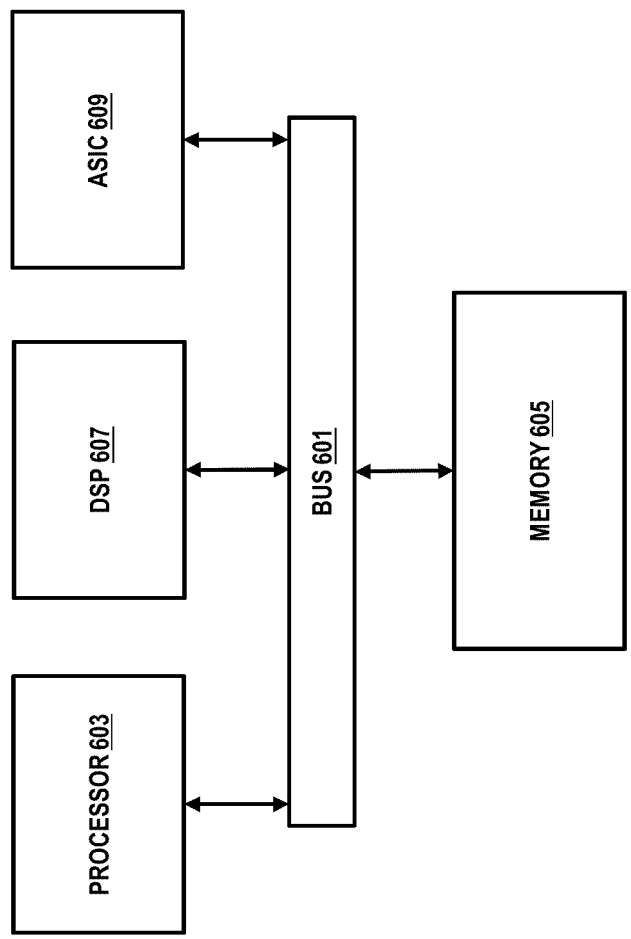
FIG. 6 is a diagram of a chip set that can be used to implement an embodiment of the invention.

FIGS. 3A-3C are flowcharts of processes for providing real-time notifications to caregivers based on the detected presence of a child in a car seat, according to various embodiments. In one embodiment, processes 300, 308, and 316 are implemented in, for instance, a chip set including a processor and a memory as shown in FIG. 6. It is contemplated that these processes 300, 308, and 316 may be executed by the notification service platform 103, the notification module 117, and/or sensors 115a-115n, depending on the particular application. Further, it is noted that the steps of the process may be performed in any suitable order, as well as combined or separated in any suitable manner. In step 301 of process 300 (FIG. 3A), process 300 detects physical presence of an object within a car seat via a sensor affixed to the car seat. As noted, the sensor may have wireless connectivity to a user device of a caregiver of a child, connectivity to the notification service platform 103, or a combination thereof. Also, the sensor may be configured to detect presence information pertaining to the child in the car seat.

In a step 303, process 300 determines a proximity threshold between a mobile device (e.g., user device 101a) and the car seat 107 is satisfied based on the presence information, range information (e.g., location information) associated with the mobile device 101a, or a combination thereof. The location information is determined by the service platform 103 in connection with a location based service of the device, including for example, global positioning based services, geospatial tracking techniques, and the like. Alternatively, the range information can be determined using general radio ranging techniques (e.g., triangulation, near-field techniques, etc.). Per step 305, the notification service platform 103 generates a message to indicate the presence of the object (e.g., child 111) in the car seat 107 based on the determination of the physical presence of the child.

In step 307, process 300 initiates transmission of the notification message to the mobile device 101a with a predetermined proximity of the car seat 107. In some embodiments, the transmission is over a direct communication connection or link between notification module 117 and user device 101n. By way of example, when a mother, who is registered as a primary caregiver, and eldest son (as secondary caregiver) exit the vehicle 109 to enter a grocery store, the location information is tracked to determine they are both within predetermined range; this range parameter can be configured by the subscriber of the service or determined by a service provider of the notification service. As such, process 300 transmits a notification message to the mobile device 101n of the primary caregiver. A notification message may also be transmitted to the alternate caregiver (not shown), who is within the acceptable range, when no response from the primary caregiver is received or when the caregiver is out of range. In certain embodiments, the same notification messages may be sent to the other user devices (e.g., devices 101a and 101b) simultaneously for supporting maximum response to the unattended child by respective caregivers.

In step 309 of process 308 (FIG. 3B), the weight of the object is determined using, for instance, one or more sensors 115a-115n. As mentioned previously, weight, movement, sound and other types of presence information may also be detected singularly, or in combination, for validating the presence of a child 111. Per steps 311 and 313, process 308 determines whether a proximity threshold (e.g., 10 feet) between the mobile device 101n and the car seat 107 is satisfied and establishes a wireless link directly with the mobile device 101a, respectively. This wireless link may be supported, for example, as a Bluetooth, ZigBee, Wi-FI, or other connection for enabling transport of notification messages. In another step 315, process 308 generates a notification message indicating the object, such as the child 111, is within the car seat based on the determination of presence information. As noted, the notification message may be provided in various forms, including by way of e-mail, short messaging service (SMS), multi-media messaging service (MMS), web data, etc.

As seen in FIG. 3C, on the service provider side, notification service platform 103 can, in some embodiments, offer the notification service only to subscribers of the notification service. Process 316 involves receiving an alert signal over the communication network 105 from notification module 117 in response to detection of the presence of an object, per step 317. According to one embodiment, the notification module 117 is configured to generate the notification message in response to the detection performed by one or more of the sensors 115a. In step 319, process 316 determines that a proximity threshold between user device 101n and the car seat 107 is satisfied based the presence information associated with the object, range information associated with the mobile device 101n, or a combination thereof. In one embodiment, platform 103 determines, as in step 321, whether received the alert signal is associated with a subscriber to the notification service. Once the subscriber is identified, process 316 further determines the identity of the mobile device 101n of the determined subscriber (step 323). In step 325, a notification message is generated based on the received alert signal, in response to the determination, for transmission of the notification message to the mobile device 101n.

Unlike process 300 of FIG. 3A, process 316 provides the notification through network 105 instead of a direct communication link between notification module 117 and user device 101n.

Figure 4A:
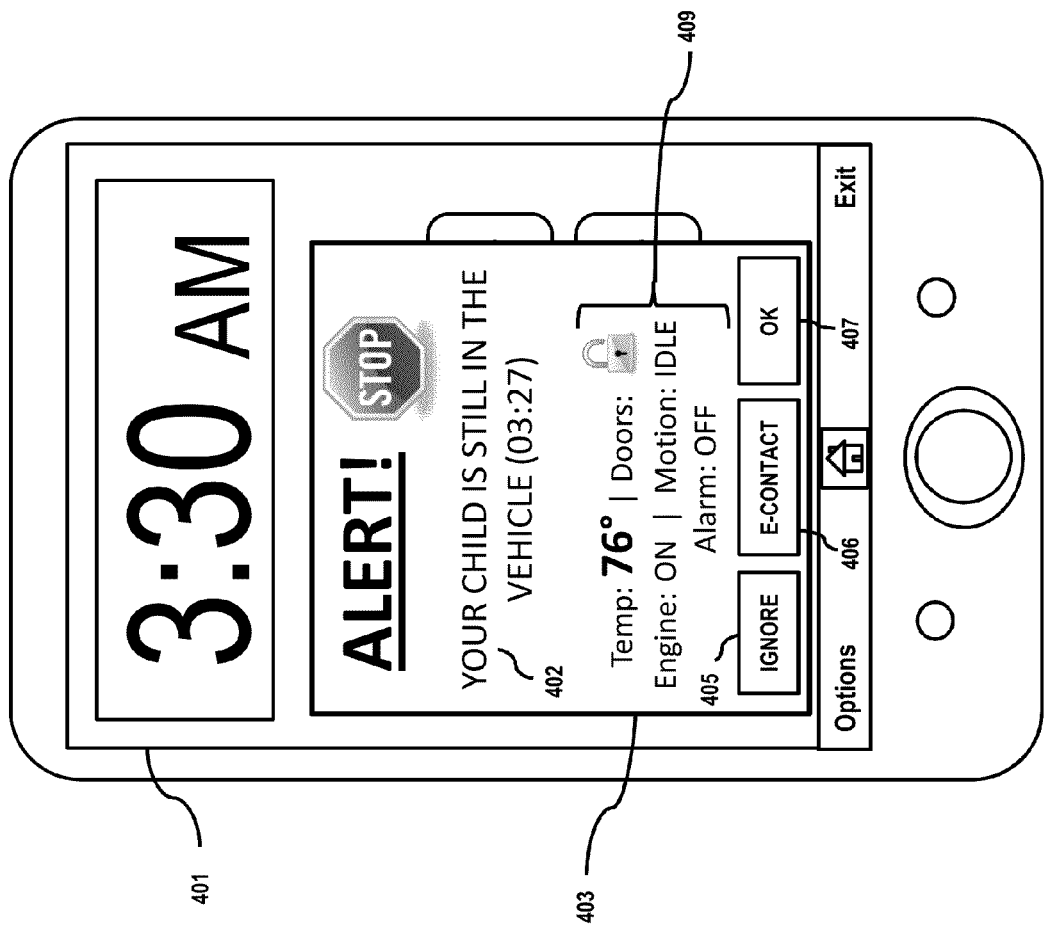
FIGS. 4A-4C are diagrams of a user interfaces for providing a notification to a caregiver based on the detected presence of a child in a car seat, according to various embodiments.
Figure 4B:
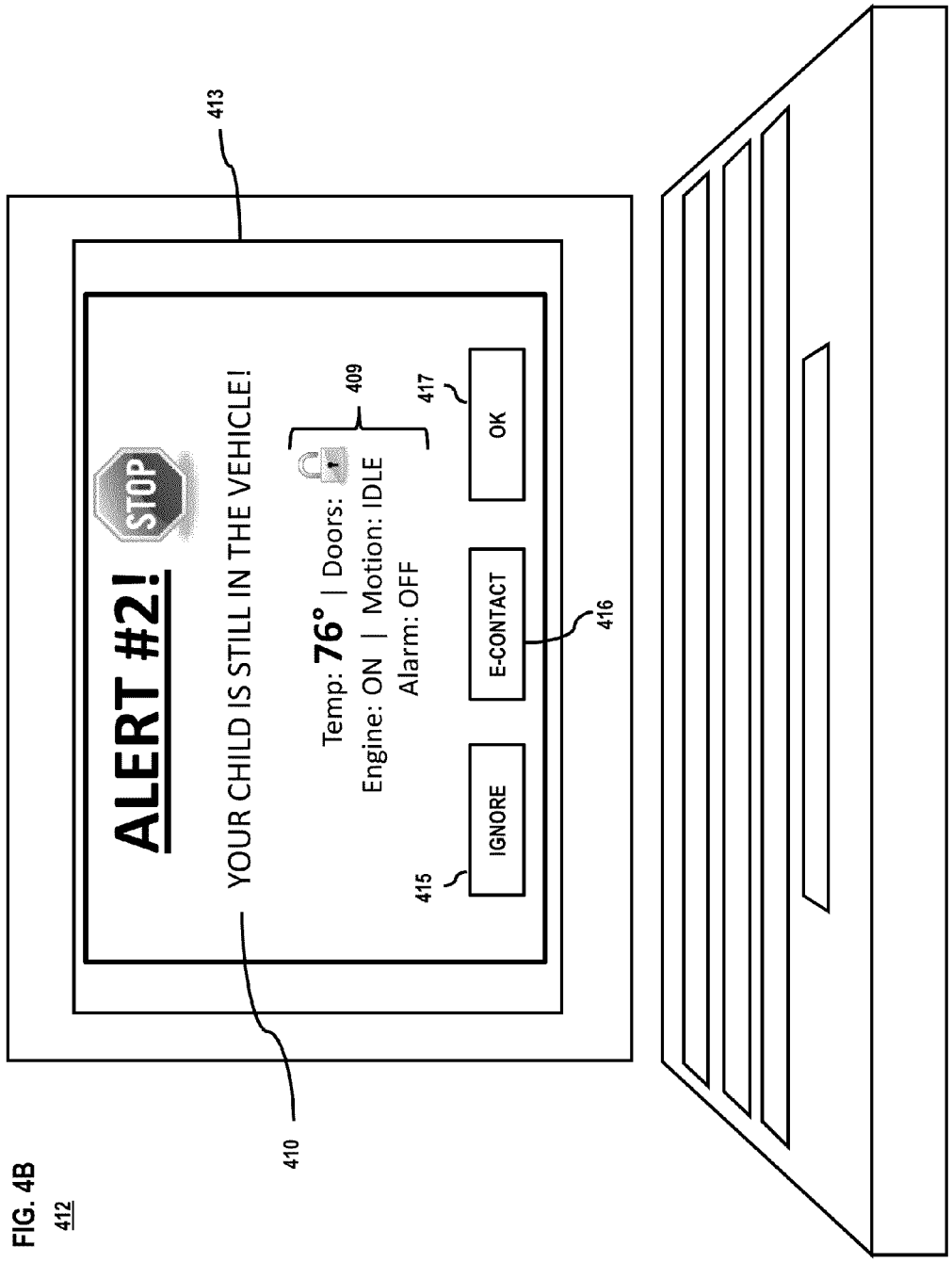
Figure 4C:
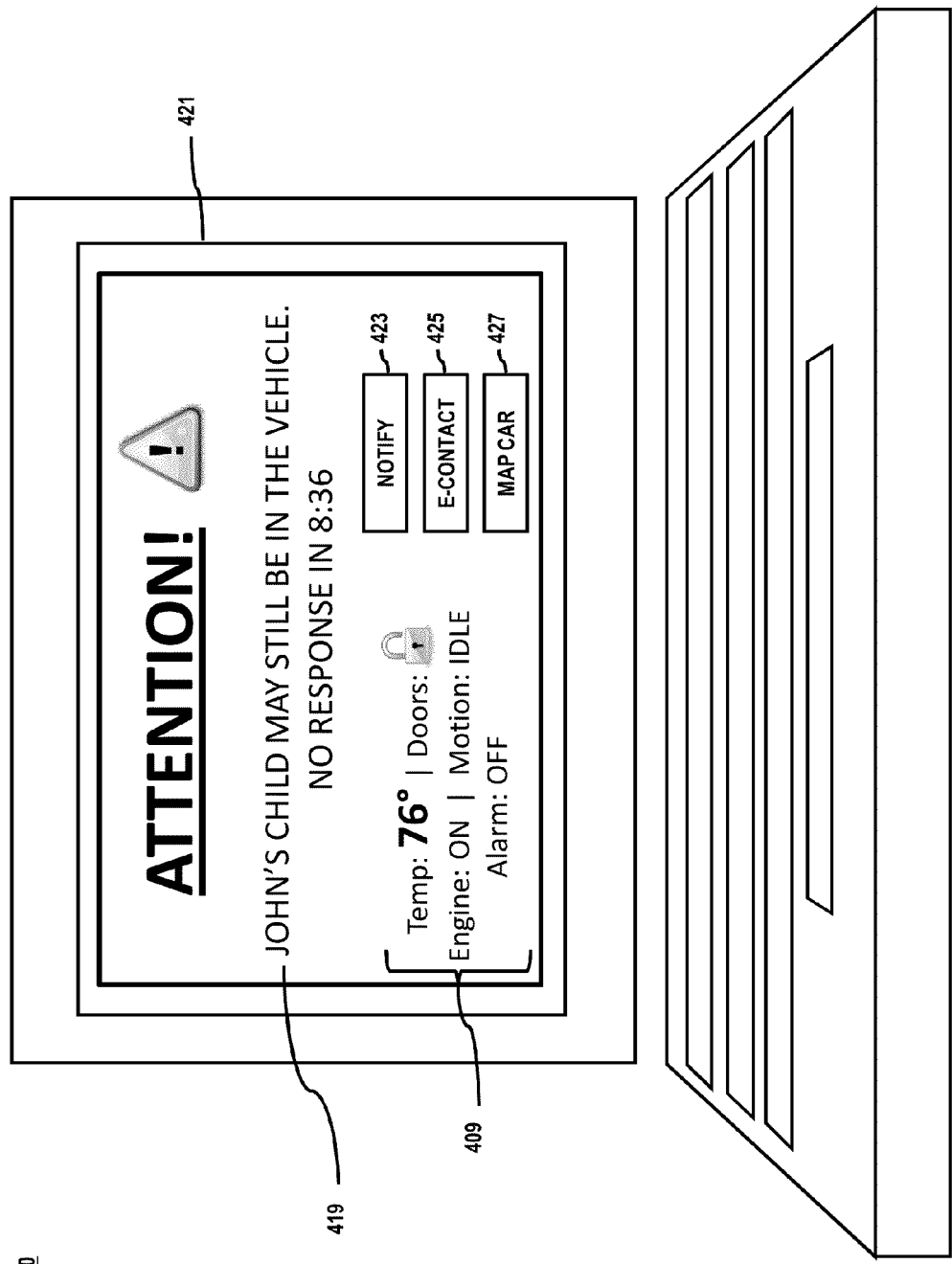

FIGS. 4A-4C are diagrams of a user interfaces for providing a notification to a caregiver based on the detected presence of a child in a car seat, according to various embodiments. The diagrams are presented from the perspective of a use case scenario of a caregiver that leaves a child unattended in a car seat for a period of time while they are out of or within range of the vehicle. Under this scenario, the caregiver has two user devices available to them in the form of a mobile device, as a primary user device, and a laptop, as a secondary registered device to receive notification messages.

In FIG. 4A, a mobile phone 400 renders to a display 401 a notification message 403 relating to an unattended child for which presence information was determined. By way of example, the notification message 403 is expressed as a pop-up window that overlaps a homepage screen of the mobile device. Hence, under this scenario, the alerts are allowed to overtake information already presented to the display 401. The notification message includes an alert message 402 for indicating that the child is still in the vehicle along with an amount of time allowable for the caregiver to respond to the notification 403. In certain embodiments, the amount of time may be established by the caregiver, the service provider, or a combination thereof. It is contemplated also, that the time to response value may be dynamic—i.e., adjustable by the notification service based on sensed condition information (e.g., temperature, vehicle status, etc.). For example, a predetermined time period (e.g., 4 minutes) is automatically adjusted in response to a determined excessive internal vehicle temperature.

Also presented with respect to this notification message 403 is condition information 409 for providing details regarding various conditions of the vehicle, environment, etc. By way of example, temperature information is presented for indicating the internal and/or external temperature. Also presented is a door locked/unlocked status, which is indicated by way of an icon of a locked or unlocked bolt lock. Condition information for the engine, motion of the vehicle and alarm status of the vehicle is also presented. It is noted that the condition information may also pertain to the condition of the child in certain instances, including an active, inactive, sleep or awake status. By presenting the condition information, the caregiver is able to further comprehend the urgency of proceeding back to the car seat where the child is located.

The caregiver is also presented with one or more action buttons 405-407 for responding to the notification message 403 as presented. An "IGNORE" action button 405 allows the caregiver to temporarily ignore the notification message or prevent its presentment to the display 401. This may be used by the caregiver in instances where the caregiver is aware of the child's presence in the car seat while they make a quick run while within range. For example, the caregiver may select the "IGNORE" action button 405 as the stand in line at a gas station where their sleeping child is within view. Similarly, the "OK" action button 407 may be selected to temporarily inform the notification service platform 103 that the caregiver is heading back to the vehicle. Location information is tracked to determine whether the caregiver is headed back, wherein a determined negligible change in distance between the caregiver's device 400 and the sensors of the car seat renders reissue of the notification message. Conversely, active reduction in distance between the device 400 and the sensors affixed to the car seat indicates an attempt by the user to satisfy the alert and causes no further presentment of the notification message 403.

The "E-Contact" action button 405 enables the caregiver to notify an emergency responder or alternate caregiver of the presence of the child in the car seat. This option can be exercised in instances where the caregiver is unable to respond to the needs of the child. By way of example, a caregiver who falls and hurts his/her leg while away from the vehicle or car seat can automatically notify the alternate or a police officer. The notification service platform 103 generates the notification message in accordance with pre-established message generation settings, i.e., text message or phone call.

In FIG. 4B, an alternate or secondary device 412 of the caregiver receives a notification message and renders it to the display 413. This message may be presented in circumstances where the mobile device 400 of FIG. 4A did receive the message, but provided no response, became inactive due to battery loss, malfunctioned, etc. As such, the secondary device is a laptop computer 412 that is also determined to be within an appropriate range for expression of alerts regarding an unattended child. As before, the alert message indicates the status of the child, while condition information 409 provides details regarding the condition of the environment and/or vehicle. The caregiver is also able to select the one or more action buttons 415-417 corresponding to action buttons 405-407 of FIG. 4A.

It is contemplated, in certain embodiments, that notification messages may be simultaneously transmitted by the service platform 103 to both the mobile device 400 and computer 412 if established by the caregiver. Also, in addition to rendering the notification messages to a display 401 and 413 of devices 400 and 412 respectively, other alerts may also be caused to occur at the devices 400 and 412. This may include, for example, generation of an alarm sound of gradually increasing intensity, causing of a vibration of the device 400 and 412, restricting of use of the device until a response to the notification message is received, or other like actions.

In FIG. 4C, a device of an alternate caregiver 420 is shown rendering a notification message to its display 421. This message may be presented in circumstances where the primary caregiver offered no response to the other notification messages, was determined out of range, or specified to notify an emergency contact. By way of example, the alert message 419 indicates that the child of a known friend "John" is left unattended along with the amount of time elapsed since the child was left. Condition information 409 is also presented to the alternate caregiver. Under this scenario, the alternate care giver observes the warm temperature reading as well as the fact that the car engine is on, but not moving. Concerned that someone may potentially try to take the car with the child in it, or that a running car at that temperature may only get warmer, the alternate caregiver selects the "NOTIFY" action button to prompt the primary caregiver to take action. Selection of the "NOTIFY" action button may result in the placement of a call to the primary caregiver or generation of an e-mail or text message.

Alternatively, the primary caregiver can select the "E-CONTACT" or "MAP CAR" action buttons 425 and 427 respectively in order to notify the police or generate a map for depicting the location of the vehicle. In the case of the "MAP CAR" action button being selected, a map is caused to be presented to the display 421 along with directions, icons and other data for depicting the whereabouts of the vehicle/car seat. The notification service platform 103 persistently updates location information for the alternate caregiver as they proceed towards the car seat, or alternatively, generates another notification message due to a lack of response by the alternate.

The exemplary techniques and systems presented herein enable notification messages to be automatically generated and transmitted in response to children being left unattended in a car seat while a parent or other caregiver is within range. Still further, the notification service platform 103 allows for the generation and transmission of notification messages in instances where the caregiver is out of range but presence information is perceived for the child. Also, another advantage afforded by the notification system 103 is that automated notification messages may be directed to alternate caregivers in cases where the primary caregiver is unable to or does not respond.

The processes described herein for providing a notification to a caregiver based on the detected presence of a child in a car seat may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
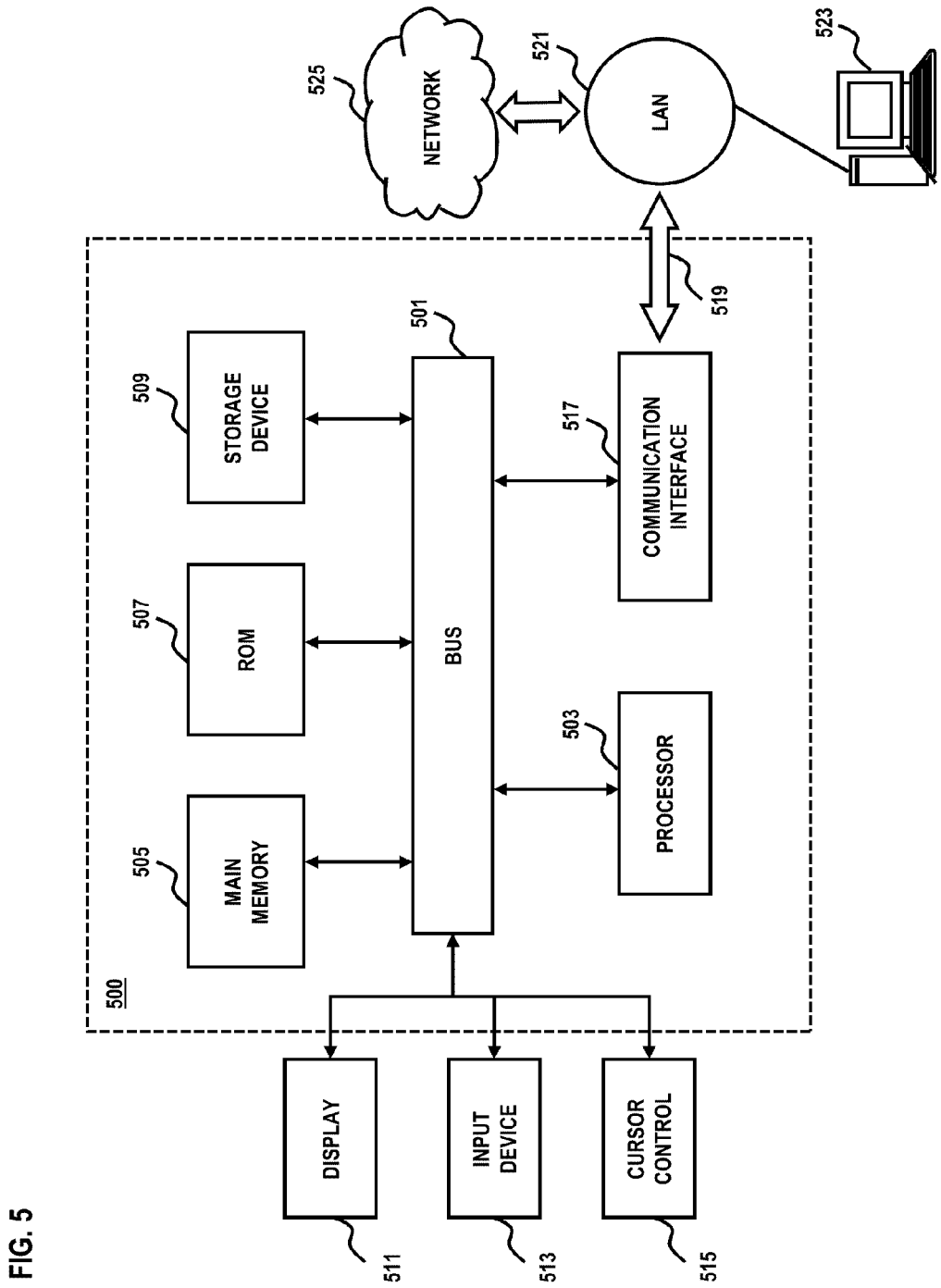
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4C, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to provide a notification to a caregiver based on the detected presence of a child in a car seat as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing a notification to a caregiver based on the detected presence of a child in a car seat.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide a notification to a caregiver based on the detected presence of a child in a car seat. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   detecting physical presence of an object within a car seat;
   determining that a proximity threshold between a mobile device and the car seat is satisfied based on the detected physical presence of the object, range information associated with the mobile device, or a combination thereof;
   generating a notification message, in response to the detected physical presence of the object, to indicate the presence of the object in the car seat based on the determination; and initiating transmission of the notification message to another mobile device based on the mobile device being outside of a predetermined proximity.

2. A method of claim 1, wherein the detection is performed using a sensor affixed to the car seat, the method further comprising:
determining weight of the object using the sensor.

3. A method of claim 1, further comprising:
establishing a wireless link directly with the mobile device to transport the notification message.

4. A method of claim 3, wherein the notification message is generated periodically to indicate the presence of the object within the car seat, and the notification message includes sound data, text data, an icon, a graphic, or a combination thereof.

5. A method of claim 1, wherein the notification message is transmitted to a node in a communication network, the communication network being configured to establish a communication connection with the mobile device to transport the notification message.

6. A method of claim 1, wherein the sensor is among a plurality of sensors including a vehicle sensor that is associated with a vehicle for transporting the car seat, and the vehicle sensor is configured to determine condition information relating to condition or environment associated with the vehicle, wherein the notification message includes the condition information, and the range information includes location information.

7. A method of claim 6, wherein the condition information relates to temperature, vehicle security status, motion of the vehicle, or a combination thereof.

8. A method of claim 1, wherein the presence information includes weight data, motion data, or a combination thereof.

9. A method of claim 1, further comprising:
initiating transmission of the notification message to the mobile device within a predetermined proximity of the car seat; and
initiating transmission of the notification message to the another mobile device based on failure of the mobile device to respond to the notification message.

10. A method of claim 1, wherein the mobile device is configured to generate an alarm message with increasing intensity based on frequency of retransmission of the notification message to the mobile device.

11. An apparatus comprising:
at least one processor; and
at least one memory including computer program code for one or more programs,
the at least one memory and the computer program code configured to, with the at least one processor, cause the apparatus to perform at least the following,
detect physical presence of an object within a car seat via a sensor affixed to the car seat;
determine that a proximity threshold between a mobile device and the car seat is exceeded based on the detected presence of the object, range information associated with the mobile device, or a combination thereof;
generate a notification message, in response to the detected physical presence of the object, to indicate the presence of the object in the car seat based on the determination; and
initiate transmission of the notification message to another mobile device based on the mobile device being outside of a predetermined proximity.

12. An apparatus of claim 11, wherein the detection is performed using a sensor affixed to the car seat, and the apparatus is further caused to:
determine weight of the object using the sensor.

13. An apparatus of claim 11, wherein the apparatus is further caused to:
establish a wireless link directly with the mobile device to transport the notification message.

14. An apparatus of claim 13, wherein the notification message is generated periodically to indicate the presence of the object within the car seat, and the notification message includes sound data, text data, an icon, a graphic, or a combination thereof.

15. An apparatus of claim 11, wherein the notification message is transmitted to a node in a communication network, the communication network being configured to establish a communication connection with the mobile device to transport the notification message.

16. An apparatus of claim 11, wherein the sensor is among a plurality of sensors including a vehicle sensor that is associated with a vehicle for transporting the car seat, and the vehicle sensor is configured to determine condition information relating to condition or environment associated with the vehicle, wherein the notification message includes the condition information, and the range information includes location information.

17. An apparatus of claim 16, wherein the condition information relates to temperature, vehicle security status, motion of the vehicle, or a combination thereof.

18. An apparatus of claim 11, wherein the presence information includes weight data, motion data, or a combination thereof.

19. An apparatus of claim 11, wherein the apparatus is further caused to:
initiate transmission of the notification message to the mobile device within a predetermined proximity of the car seat; and
initiate transmission of the notification message to the another mobile device based on failure of the mobile device to respond to the notification message.

20. An apparatus of claim 11, wherein the mobile device is configured to generate an alarm message with increasing intensity based on frequency of retransmission of the notification message to the mobile device.

21. A method comprising:
receiving an alert signal over a communication network from a notification module configured to generate the notification message in response to detection of a physical presence of an object within a car seat;
determining a proximity threshold between a mobile device and the car seat is satisfied based on presence information associated with the object, range information associated with the mobile device, or a combination thereof device;
generating a notification message based on the received alert signal, in response to the determination, for transmission of the notification message to the mobile device; and
initiating transmission of the notification message to the mobile device within a predetermined proximity of the car seat; and
initiating transmission of the notification message to another mobile device based on failure of the mobile device to respond to the notification message.

22. A method of claim 21, further comprising:
determining whether the alert signal is associated with a subscriber to a notification service; and determining identity of the mobile device associated with the determined subscriber.

\* \* \* \* \*